United States Patent
Glaser

(10) Patent No.: US 8,037,615 B2
(45) Date of Patent: Oct. 18, 2011

(54) PROCESS AND DEVICE FOR DETERMINING THE ALIGNMENT OF TWO ROTATABLE MACHINE PARTS, THE ALIGNMENT OF TWO HOLLOW CYLINDRICAL MACHINE PARTS OR FOR TESTING A COMPONENT FOR STRAIGHTNESS ALONG A LENGTHWISE SIDE

(75) Inventor: Bernhard Otto Rudolf Glaser, Ismaning (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 290 days.

(21) Appl. No.: 12/388,690

(22) Filed: Feb. 19, 2009

(65) Prior Publication Data
US 2009/0211105 A1   Aug. 27, 2009

(30) Foreign Application Priority Data
Feb. 25, 2008   (DE) .......................... 10 2008 010 916

(51) Int. Cl.
G01B 13/18 (2006.01)
G01B 11/26 (2006.01)
(52) U.S. Cl. ............................... 33/286; 33/412; 33/529
(58) Field of Classification Search .................... 33/412, 33/644, 645, DIG. 21, 529, 533, 661
See application file for complete search history.

(56) References Cited

U.S. PATENT DOCUMENTS

| | | | | |
|---|---|---|---|---|
| 5,026,998 A | * | 6/1991 | Holzl | 356/152.3 |
| 5,077,905 A | * | 1/1992 | Murray, Jr. | 33/412 |
| 5,371,953 A | * | 12/1994 | Nower et al. | 33/412 |
| 6,040,903 A | * | 3/2000 | Lysen et al. | 33/412 |
| 6,434,849 B1 | * | 8/2002 | Hermann | 33/412 |
| 6,609,305 B2 | * | 8/2003 | Lysen | 33/412 |
| 6,662,457 B2 | * | 12/2003 | Dameron | 33/286 |
| 6,763,597 B2 | | 7/2004 | Lysen | |
| 6,784,986 B2 | * | 8/2004 | Lysen et al. | 33/412 |
| 6,931,738 B2 | | 8/2005 | Bodgren et al. | |
| 6,968,625 B2 | * | 11/2005 | Segerstrom et al. | 33/286 |
| 7,174,649 B1 | * | 2/2007 | Harris | 33/412 |
| 7,175,342 B2 | * | 2/2007 | Tanaka et al. | 33/412 |
| 7,242,465 B2 | * | 7/2007 | Lacko et al. | 33/412 |
| 7,460,977 B2 | * | 12/2008 | Stromberg et al. | 356/153 |
| 7,672,001 B2 | | 3/2010 | Hermann | |
| 2002/0138995 A1 | * | 10/2002 | Dameron | 33/412 |

FOREIGN PATENT DOCUMENTS

DE    290 783 A7    6/1991
GB    2 330 470 A    4/1999

* cited by examiner

*Primary Examiner* — Yaritza Guadalupe-McCall
(74) *Attorney, Agent, or Firm* — Roberts Mlotkowski Safran & Cole, P.C.; David S. Safran

(57) ABSTRACT

A process and a corresponding device for determining the alignment of two rotatable machine parts, the alignment of two hollow cylindrical machine parts or for testing a component for straightness along one lengthwise side, with a first measurement unit with a light source for emitting a light beam which has been expanded in one plane, and a second measurement unit with an optical detector unit which has two linear sensors which are arranged parallel to one another, and with an evaluation unit to evaluate a light pattern which has been produced by the two-dimensionally expanded light beam for determining the misalignment of the axes of the machine parts relative to one another, or optionally, the straightness of the component, by the determination the points of incidence of the two-dimensionally expanded light beam on the sensors.

16 Claims, 2 Drawing Sheets

PROCESS AND DEVICE FOR DETERMINING THE ALIGNMENT OF TWO ROTATABLE MACHINE PARTS, THE ALIGNMENT OF TWO HOLLOW CYLINDRICAL MACHINE PARTS OR FOR TESTING A COMPONENT FOR STRAIGHTNESS ALONG A LENGTHWISE SIDE

BACKGROUND OF THE INVENTION

1. Field of Invention

The invention relates to a process for determining the alignment of two rotatable machine parts, the use of the process for determining the coupling play between two coupled machine parts, a process for testing a component for straightness along a lengthwise side, a process for determining the alignment of two hollow cylindrical machine parts, and a device for determining the alignment of two rotatable machine parts, the alignment of two hollow cylindrical machine parts or testing a component for straightness.

2. Description of Related Art

In many technical fields, the object is to determine the spatial and/or angular location of two rotatable machine parts, especially two rotating shafts, relative to one another. Thus, for example, in the calibration and adjustment of machine tools, there is a demand for aligning the machine spindles relative to one another with high precision; this assumes exact determination of the relative spatial and angular locations of the spindles to one another. Furthermore, many drive systems have shafts which are coupled to one another for transfer of torque and/or force, and whose relative alignment must be optimized to keep wear of the drive systems as low as possible.

Often, the rotating machine parts to be measured are connected to one another by a coupling element. The relative alignment of the two machine parts thus has a great effect on the operating load of the coupling element. The higher the misalignment of the two machine parts relative to one another, the higher the forces and torques to which the coupling element is exposed during operation. Therefore, it is important to determine the relative alignment of the two rotating machine parts with high precision in order to be able to minimize the angular deviation and the spatial offset between the machine parts by adjustment of the axes of rotation.

Various processes and devices are known for checking, measuring and assessing the relative alignment of two machine parts. For this purpose, for example, reference is made to German Patent Application DE 38 14 466 A1 and corresponding U.S. Pat. No. 6,356,348 B1, German Patent Application DE 101 22 321 A1 and European Patent Application EP 1 248 071 A2.

German Patent Application DE 39 11 307 A1 and corresponding U.S. Pat. No. 5,026,998 disclose a process for ascertaining whether two successively arranged shafts are flush or offset with respect to their center axes. In accordance with this process, a first measurement unit is attached to the first machine part, and a second measurement unit is attached to the second machine part so that a light beam is incident on the detector unit and that a light pattern produced by the light beam is used for determining any misalignment of the axes of the machine parts relative to one another. For determining misalignment, the points of incidence of the light beam on the sensors is used. The measurement signals in the individual measurement angle positions are produced separately for each shaft as signals which are proportional to the distance components which the middle axes of the shafts have from one another in the plane (measurement plane) which is permanently assigned to the respective shaft and which is essentially perpendicular to it in the radial direction which is fixed by the respective measurement position, the measurement angular position. Furthermore, to produce the measurement signals in the individual measurement angle positions of each of the two shafts a measurement pointer is pointed at the shaft which is the other one at the time and which extends in the regions of the pertinent reference element on this acceptance shaft which delivers a signal which corresponds to the radial distance of the middle axis of the measurement pointer from the reference point in the plane of the reference element which is roughly perpendicular to the middle axis of this other shaft.

An especially precise measuring device for determining the alignment of two machine parts using an optical process is described in German Patent Application DE 10 2006 020 358 A1 and corresponding U.S. Patent Application Publication 2007/0253002. This device comprises a light source which emits a repeatedly expanded light beam so that the cross section of this emitted light beam has the shape of cross hairs. The device also comprises a detector unit with at least three sensor arrays or position-sensitive diodes for direct or indirect determination of the incidence points of the light beam which has been expanded in two or more planes. To measure the relative alignment of the two machine parts, the light source is mounted on the first machine part and the detector unit is mounted on the other machine part. If, at this point, the two machine parts are turned synchronously with the light source and detector unit mounted on them, the device of German Patent Application DE 10 2006 020 358 A1 allows high precision determination of the spatial and angular position of the first machine part relative to the second machine part.

European Patent Application EP 1 698 855 A1 and corresponding U.S. Pat. No. 7,486,390 discloses a process for alignment of machines and machine elements or the like, especially of pipes or hollow cylinders, in one of two measurement phases for a fixed light emission and reception device rotation of one reflector prism taking place in at least three optionally selectable rotary positions together with the pertinent data acquisition and in the other of the two measurement phases with a fixed reflector prism rotation of the light emitting and reception device into either two predefined rotary positions which are at a right angle to one another or three or more optionally selectable rotary positions taking place together with the pertinent data acquisition.

However, the known devices are either relative complex or the accuracy of measurement is not especially high.

It also has been established that the measurement is sensitively distorted when there is coupling play between the two coupled machine parts. In this case, the coupling play adulterates the determined values of the relative spatial and angular positions of the two machine parts.

SUMMARY OF THE INVENTION

Therefore, a primary object of the present invention is to enable the alignment of two rotatable machine parts, or of hollow cylindrical machine parts, or testing of a component for straightness along a lengthwise side which is relatively simple, and at the same time, extremely precise.

The object is achieved by the features of the invention described below.

In the process for determining the alignment of two rotatable machine parts with a first measurement unit with a light source for emitting a light beam which has been expanded in one plane and a second measurement unit with an optical detector unit which is comprised of two line sensors which are arranged parallel to one another, it is provided that, in the determination, the first measurement unit is mounted on the first machine part and the second measurement unit is mounted on the second machine part so that the light beam which has been expanded in two dimensions is aligned parallel to the axis of the first machine part and is incident on the detector unit and that a light pattern which has been produced by the two-dimensionally expanded light beam for determining the misalignment of the axes of the machine parts relative to one another is evaluated, and for determining the misalignment, the points of incidence of the two-dimensionally expanded light beam on the cell sensors are used.

The process in accordance with the invention, for rotary machine parts, uses a measurement device with a light source and an optically measuring detector unit, the light source being mounted on the first machine part and the detector unit being mounted on the second machine part. The light source emits a two-dimensionally expanded light beam whose image on the detector unit which lies opposite the light source has the shape of a straight line. At this point, if the first machine part is rotated, the light beam follows the rotation of the first machine part. The light line produced by the expanded light beam on the detector unit thus, first, executes a rotational motion which, after overcoming the coupling play, passes into relative motion whose magnitude is determined by the angular and lateral offset of the axes of the two machine parts.

Advantageously, the detector unit has two linear sensors which are arranged parallel to one another, especially CCD line arrays or position-sensitive diodes (PSDs) which are arranged relative to the light source such that the expanded light beam runs roughly perpendicular to them so that the line image of the light beam produced on the detector element intersects the two line arrays roughly vertically and in the middle; the points of incidence of the expanded light beam on the line sensors then migrate along the line sensors in rotations of the expanded light beam relative to the detector unit, but do not leave them. This migration of the points of incidence on the line sensors during rotation of the first machine part makes it possible to determine a misalignment.

In contrast to the prior art which is known, for example, from German Patent Application DE 39 11 307 A1 and corresponding U.S. Pat. No. 5,026,998, the laser beam is not a point, but is expanded into a line which runs tangentially to a circle around the axis of rotation. By using two parallel line sensors, the total precision can be increased since the error can be computed out.

An especially accurately measuring embodiment of the process is preferred in which a third measurement unit with a light source for emitting a light beam expanded in one plane and a fourth measurement unit with an optical detector unit which is comprised of two line sensors which are arranged parallel to one another are used, and in which the fourth measurement unit is mounted on the first machine part, and the third measurement unit is mounted on the second machine part so that the two-dimensionally expanded light beam of the light source of the third measurement unit is incident on the detector unit of the fourth measurement unit and that, when at least one of the machine parts is rotating around its axis, a light pattern which has been produced by the two-dimensionally expanded light beam for determining the misalignment of the axes of the machine parts relative to one another is evaluated, for determining the misalignment the incidence points of at least one of the two dimensionally expanded light beams on the line sensors being used.

The invention can be favorably used for determining the alignment of coupled and uncoupled machine parts.

For loosely coupled machine parts with coupling play, the second machine part is first at rest. It is shown that the migration motion of these points of incidence runs first roughly linearly to the angle of rotation of the first machine part until, with overcoming of the coupling play, the migration motion assumes another characteristic. Therefore, advantageously, for computing the coupling play, the final values of the quasi-linear migration motion of the points of incidence of the expanded light beam on the line sensors are used. Measurement of the motion of the light line on the detector unit during startup of the first machine part thus enables determination of the coupling play between the two machine parts. Preferably, the coupling play is taken into account when the alignment state is determined for each rotary position of the shaft.

Furthermore, it is advantageous to also determine the alignment of the two machine parts in a following process step after determining the coupling play. The process thus makes it possible to determine both the coupling play and also the relative alignment of two coupled, rotatable machine parts with high precision.

According to one favorable embodiment of the invention, in rotation with coupling play, in accordance with the invention, a correction value for the points of incidence of the light beam on the line sensors can be determined. At a distance i of the line sensors and coupling play with an angle of the coupling play $\Delta\beta$, between the measured values of the points of incidence of the light beam on the first line sensor E1 and the second line sensor E2 and $\Delta\beta$ the relationship is $\tan \Delta\beta = (E2-E1)/2I$ if the connecting line of the points of incidence of the laser beam on the line sensors at the start of rotation lies oriented perpendicular to the line sensors.

If the laser is arranged with a clamping height of R relative to the axis of rotation of the machine part, for the coupling play $\beta$ for the corrected value $\gamma$ of the points of incidence of the light beam on the line sensors, the applicable relationship is:

$$\gamma = E1 + (E2-E1)/2 - R(\sin \Delta\beta - \tan \Delta\beta + \cos \Delta\beta - 1).$$

To determine the alignment, measurement takes place, preferably, for three different angular positions of the machine parts relative to one another.

Preferably, the machine parts for determination of the alignment are loosely coupled by a coupling element, an external torque being applied to only one of the machine parts. The coupling element can, for example, be a bolt located between the machine parts. The other machine part is simply supported. After overcoming the coupling play, the coupling element behaves elastically, preferably like a spring with a linear force law. Therefore, radial movement of the second machine part occurs with a direction of rotation of the second machine part which is opposite the direction of rotation impressed by the external torque and which is superimposed on the rotary motion caused by the first machine element as soon as the elastic coupling element vibrates back. This relative motion likewise corresponds to coupling play, in the opposite direction of rotation to the initial direction of rotation, which leads to adulteration of the measured values of the incidence points and which can be corrected in accordance with the invention.

The process in accordance with the invention can be used especially to determine the coupling play between two coupled machine parts in a measurement robot or a coordinate measuring device. Furthermore, the process in accordance with the invention is suited for determining the coupling play and for a suitably configured measurement means for simultaneous alignment of two coupling shafts in any power transmission unit, especially the motor, a pump or a transmission.

According to another aspect of the invention, to determine the alignment of two hollow cylindrical machine parts with a first measurement unit with a light source for emitting a light beam which has been expanded in one plane, and a second measurement unit with an optical detector unit which has two line sensors which are arranged parallel to one another, it is provided that, in the determination, the first measurement unit is located parallel to the axis in the first machine part and the second measurement unit is located parallel to the axis in the second machine part, that the two-dimensionally expanded light beam which is located parallel to the axis of the first machine part is incident on the detector unit, at least one of the measurement units being able to turn coaxially and during rotation of at least one of the measurement units around its axis, a light pattern which has been produced by the two-dimensionally expanded light beam is evaluated for determining the misalignment of the axes relative to one another, and for determining the misalignment the points of incidence of the two-dimensionally expanded light beam on the line sensors is used. A process for aligning hollow cylindrical machine parts is known from U.S. Pat. No. 7,486,390, the disclosure of which is hereby incorporated by reference. By using two parallel line sensors, the overall accuracy can also be increased here since errors can be computed out.

According to one development of this process, it is provided that a third measurement unit with a light source for emitting a light beam expanded in one plane and a fourth measurement unit with an optical detector unit which has two line sensors which are located parallel to one another are used, in the determination, the third measurement unit being located parallel to the axis in the second machine part, and the fourth measurement unit being located parallel to the axis around the axis in the first machine part so that the two-dimensionally expanded light beam is incident on the detector unit and that the third measurement unit is permanently connected to the second measurement unit and the fourth measurement unit is permanently connected to the first measurement unit and when at least one of the measurement units turns around its axis, a light pattern produced by at least one of the two-dimensionally expanded light beams is evaluated for determining the misalignment of the axes relative to one another, and for determining the misalignment the points of incidence of the two dimensionally expanded light means on the line sensors is used.

The invention furthermore comprises devices according to the independent apparatus claims.

Optionally, if the first and fourth measurement unit and the second and third measurement unit are each located in a measurement head, this simplifies production and handling in the execution of the corresponding devices.

According to another aspect of the invention, in a process for testing one component for straightness along a lengthwise side with a first measurement unit with a light source for emitting a light beam which has been expanded in one plane and a second measurement unit with an optical detector unit which has two line sensors which are located parallel to one another, at least one of the measurement units along the lengthwise side being moved during testing, it is provided that a light pattern which has been produced by the two-dimensionally expanded light beam on the detector unit is evaluated.

By using two parallel line sensors the overall accuracy can also be increased here since errors can be computed out.

Furthermore, it is advantageous if, in a following process step, for a change of the transverse angle of inclination of the measurement unit which occurs in the motion of the measurement unit along the lengthwise side, it is provided that a correction value for the points of incidence of the light beam(s) on the line sensors is determined.

After determining the coupling play it is possible, in accordance with the invention, to also carry out determination of the alignment of the two machine parts. The process thus makes it possible to determine the coupling play and also the relative alignment of two coupled, rotatable machine parts with high precision.

The invention is explained in detail below using an embodiment which is shown in the drawings.

DETAILED DESCRIPTION OF THE INVENTION

Figure 1:
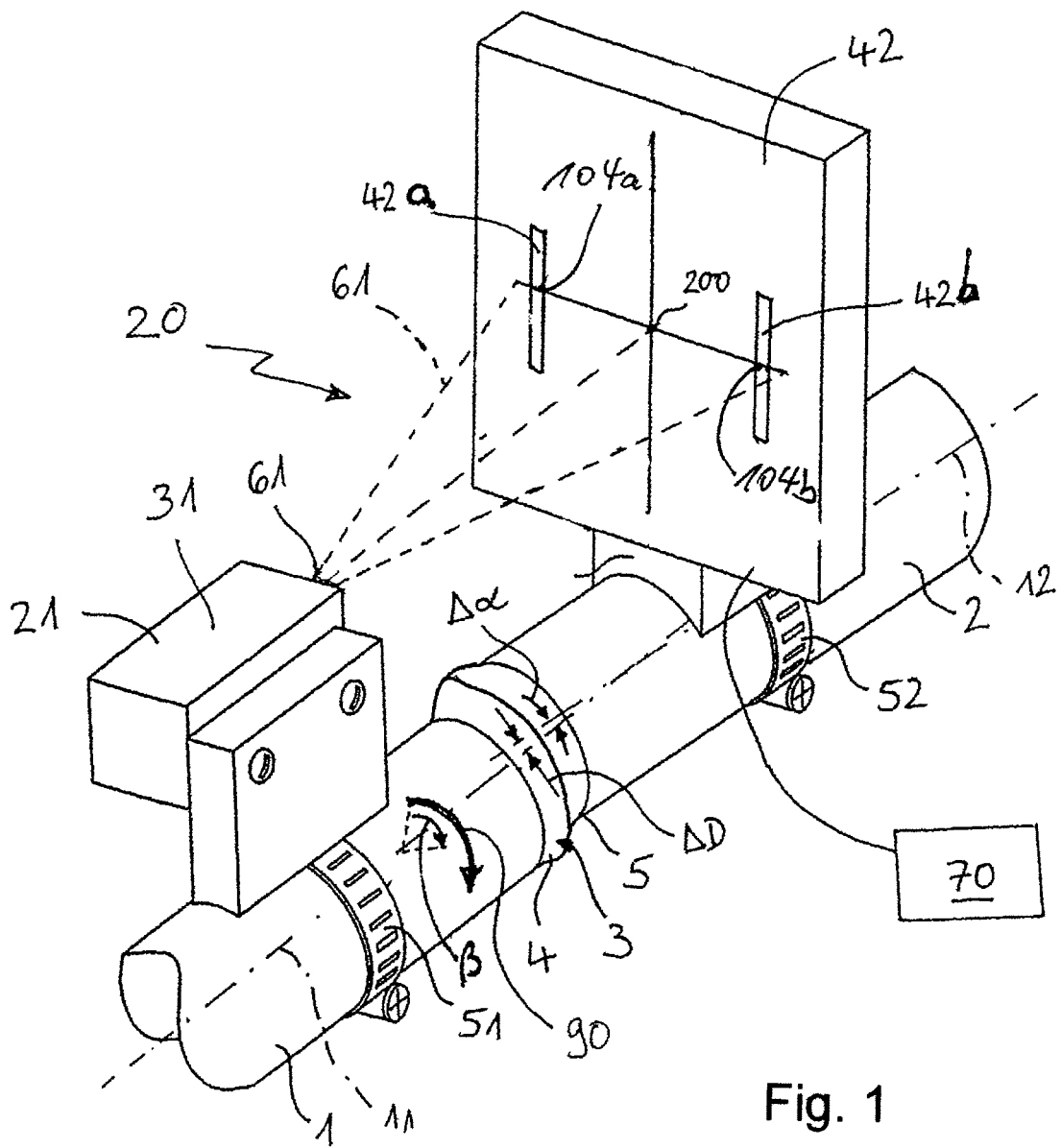
FIG. 1 is a schematic perspective view of the measurement device for determining the alignment of two rotatable machine parts with a light source that emits a two-dimensionally expanded light beam and a detector unit with two line sensors which are mounted on the machine parts.

FIG. 1 shows two rotatable machine parts 1, 2, especially shafts, with axes of rotation 11, 12. The machine parts 1, 2 are coupled loosely to one another by a coupling element 3 with coupling halves 4, 5.

The two machine parts 1, 2 are arranged roughly parallel and flush, but in general have an offset $\Delta D$ relative to one another; furthermore, the axes of rotation 11, 21 of the two machine parts 1, 2 generally include an angle $\Delta \alpha$ relative to one another. The greater the offset $\Delta D$ or the angle $\Delta \alpha$, the higher the loading of the coupling elements 3 during operation. The offset $\Delta D$ and the angle $\Delta \alpha$ of the machine parts 1, 2 are shown highly exaggerated in FIG. 1.

To determine the relative alignment of the machine parts 1, 2, the measurement device 20 shown in FIG. 1 is used; its structure and manner of operation are described analogously to that in DE 39 11 307 A1. Its disclosure contents are herewith taken into this application. In contrast to this prior art however in accordance with the invention the laser beam is not a point, but is expanded into a line which runs tangentially to a circle around an axis 11 of rotation.

In another embodiment which is not shown in FIG. 1, the machine parts cannot be coupled either. The determination of alignment takes place analogously to that in German Patent Application DE 39 11 307 A1 and corresponding U.S. Pat. No. 5,026,998. The measurement device 20 has two units 21, 42, the first unit 21 constituting a light source 31, while the second unit 42 constitutes a detector unit for measuring the radiation emitted from the light source 31. The light source 31 is a laser which is provided with optics (not shown in FIG. 1) for producing a fan-shaped, expanded laser light beam 61 which is oriented forward. The detector unit 42 comprises two linear sensors 42a, 42b which are located parallel to one another. The linear sensors 42a, 42b can be especially CCD line arrays or position-sensitive diodes (PSDs). The detector unit 42 thus constitutes a receiving device for the incident laser beam.

To evaluate the measured values of the linear sensors 42a, 42b, there is an evaluation unit 70. With respect to advantageous embodiments, details and the manner of operation of a suitable measurement device 42, in any case with more than two line sensors, reference is made to U.S. Patent Application Publication 2007/0253002 the disclosure of which is hereby incorporated by reference into this application that is commonly owned with the present application.

To carry out determination of the relative alignment of the machine parts 1, 2, the units 21, 22 are attached to the machine parts 1, 2 to be measured using holders 51, 52. Then, the light source 31 and/or the detector unit 42 are shifted in the holder 51, 52 such that the laser light beam 61 which has been expanded into the shape of a fan is incident on the two linear sensors 42a, 42b of the detector unit 42. This is shown schematically in FIG. 1.

It goes without saying that, when the second machine part turns, accordingly the process can take place analogously, since it is simply a manner of the relative movement of the two machine parts 1, 2 with respect to one another.

At this point, if the first machine part 1 is turned around its axis 11 (arrow 90 in FIG. 1), the second machine part 2, which is coupled by way of the coupling element 3, follows this rotation; the light source 31 attached on the first machine part 1 and the detector unit 42 attached on the second machine part 2 likewise execute this rotation. If the two axes 11, 12 of the machine parts 1, 2 are aligned perfectly flush (i.e., axial offset ΔD=0 and axial angle Δα=0), during this rotary motion 90, the relative position of the laser light beam 61 relative to the detector unit 42 does not change, so that the points of incidence 104a, 104b of the laser light beam 61 remain in their original positions of the line sensors 42a, 42b.

However, if there is an axial offset Δx≠0 and/or an axial angle Δα≠0 between the two machine parts 1, 2, the points of incidence of the laser light bundle 61 on the line sensors 42a, 42b migrate during the rotary motion 90.

To determine the alignment, a measurement is taken preferably for three different angular positions of the machine parts.

Figure 2:
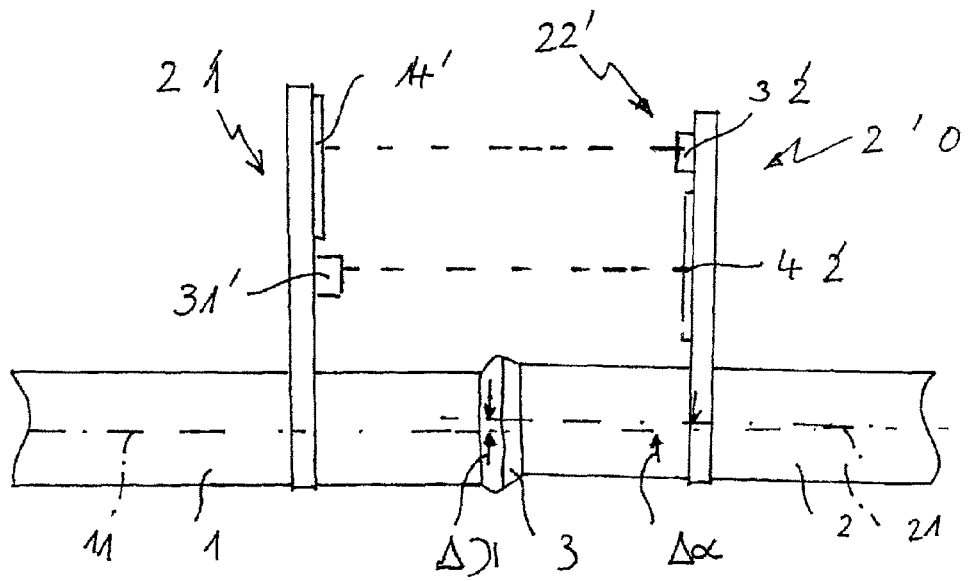
FIG. 2 is a schematic side view of a measurement device with two light sources and two detector units.

To determine the axial offset ΔD and the axial angle Δα, advantageously, the measurement device 20' shown schematically in a section in FIG. 2 is used; its units 21', 22' each have a light source 31', 32' and a detector unit 41', 42' of the type shown in FIG. 1, the measurement units 31', 41' and 32', 42', preferably, each unit being arranged in a measurement head.

Inaccuracies or adulterations of the measurement values determined in this way occur when, as a result of the coupling element 3 which connects the machine parts 1, 2, there is play between these machine parts 1, 2. This coupling play Δβ must be extracted in the approach to or in the course of evaluating the measured values in order to be able to determine and compute out the perturbation effects which the coupling play has on the measurement.

The determination of the coupling play Δβ is performed using the measurement device 20 shown in FIG. 1 and is based on the following consideration: If proceeding from the original location of the machine parts 1, 2 shown in FIG. 1—the machine part 1 is turned in the direction of the arrow 90 by an increasing angle β, as a result of the coupling play the machine part 2 first remains stationary, here the light source 31 mounted on the machine part 1 is turned with the fan-shaped expanded light beam 61 relative to the detector unit 42 mounted on the machine part 2.

Figure 3:
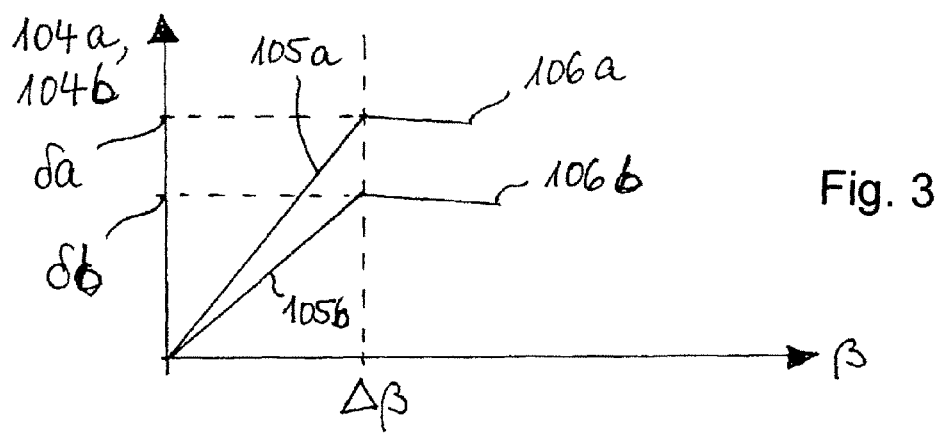
FIG. 3 is a graph of the location of the points of incidence of the expanded light beam on two opposite line sensors as a function of the angle of rotation.

FIG. 3 shows the behavior of the points of incidence 104a, 104b of the fan-shaped expanded light beam 61 on the linear sensors 42a, 42b as a function of the increasing angle of rotation β: with an increasing angle of rotation β the intersection points 104a, 104b of the light beam 61 move roughly linearly with the angle of rotation β. As soon as the coupling 3 engages when an angle of rotation Δβ is reached, which is determined by the coupling play, and the machine part 2 follows the rotation of the machine part 1, the detector unit 42 also follows the rotation of the light source 31. This is expressed in FIG. 3 by the quasi-linear increase 105a, 105b of the points of incidence passing into another, much flatter curve characteristic 106a, 106b or one even parallel relative to the β axis.

At a distance I of the sensors 42a, 42b and coupling play with an angle Δβ, between the measured values of the points of incidence E1, E2 of the light beam on the first linear sensor 42a and the second linear sensor 42b and Δβ, there is the relationship:

$$\tan \Delta\beta = (E2-E1)/2I$$

if the connecting line of the points of incidence of the laser beam on the line sensors at the start of rotation lies oriented perpendicular to the line sensors, as is shown in FIG. 1. The formula quantities E1 and E2 are assigned to the points of incidence 104a, 104b.

If the laser is arranged with a clamping height of R relative to the axis of rotation of the machine part 11, for the coupling play Δβ for the corrected value γ of the points of incidence of the light beam on the line sensors, the applicable relationship is:

$$\gamma = E1 + (E2-E1)/2 - R(\sin \Delta\beta \tan \Delta\beta + \cos \Delta\beta - 1).$$

To derive the formulas for the corrected value, in a suitable coordinate system, after plotting the equations for the three lines which are formed by the two line sensors and the incident line-shaped laser beam, rotation of the lines which represent the laser beam around the axis of rotation of the machine part is performed. This rotation corresponds to the phase in which the line sensors attached to the second machine part during rotation of the first machine part to which the light source is attached are still stationary due to the coupling play.

The procedure can also take place analogously as in the determination of the alignment of two rotatable machine parts when the alignment of two hollow cylindrical machine parts is determined.

A device with two line sensors which are arranged parallel to one another and a light beam which has been expanded in one plane can also be used to check a component for straightness along a lengthwise side. These components are, for example, railroad tracks. A device in accordance with the invention has a first measurement unit with a light source for emitting a light beam which has been expanded in one plane. Furthermore, the device has a second measurement unit with an optical detector unit which has two linear sensors which are located parallel to one another. During testing, at least one of the measurement units is moved along the lengthwise side. For deviations from straightness, during the relative movement of the measurement units, the position of the points of incidence of the light beam on the linear sensors changes; this is evaluated by an evaluation unit.

Since, during the relative motion of the measurement units, for example, due to play, the transverse angle between the line sensors and the light beam can change, in accordance with the invention, the determined measured values are corrected.

When the transverse angle Δβ* changes, for the corrected value γ* of the points of incidence of the light beam on the line sensors the applicable relationship is:

$$\gamma = E1 + (E2-E1)/2 - R(\sin \Delta\beta^* \tan \Delta\beta^* + \cos \Delta\beta^* - 1).$$

What is claimed is:

1. Process for determining the alignment of two rotatable machine parts with a first measurement unit with a light source for emitting a light beam which has been expanded in one plane, and a second measurement unit with an optical detector unit which comprises two linear sensors which are arranged parallel to one another, comprising the steps of:
mounting the first measurement unit on a first of the machine parts and the second measurement unit on a second of the machine parts,
emitting a light beam which is parallel to a longitudinal axis of the first machine part so as to be incident on the detector unit, said light beam being expanded fan-shaped in a plane transverse to said longitudinal axis and running tangentially to a circle around the axis of rotation,
evaluating the points of incidence of the light beam which has been produced by the two-dimensionally expanded light beam on the two linear sensors which are arranged parallel to one another in a direction orthogonal to said longitudinal axis and crosswise of the direction of expansion of the light beam so that the points of incidence of the expanded light beam produced on the line sensors intersect the two linear sensors in a middle area thereof and then migrate along the linear sensors during rotation of the light source relative to the detector unit, and
determining misalignment of the axes of the machine parts relative to one another based on the evaluation of the points of incidence of the light pattern.

2. Process in accordance with claim 1, comprising the further steps of:
mounting a third measurement unit, with a light source for emitting a second light beam which has been expanded in one plane, on the second of the machine parts,
mounting a fourth measurement unit, with an optical detector unit having two linear sensors which are arranged parallel to one another, on the first of the machine parts,
aligning the two-dimensionally expanded second light beam of the light source of the third measurement unit parallel to the longitudinal axis of the first machine part so as to be incident on the detector unit of the fourth measurement unit,
rotating at least one of the machine parts around its longitudinal axis, and
evaluating the incidence points of a light pattern produced by the two-dimensionally expanded light beam on the sensors of the detector unit of the fourth measurement unit for determining the misalignment of the axes of the machine parts relative to one another.

3. Process in accordance with claim 1, wherein the machine parts are loosely coupled by a coupling element, a correction value for the points of incidence of the light beam on the line sensors for coupling play which occurs when at least one of the machine parts turns is determined.

4. Process in accordance with claim 3, wherein, for determining the correction value for the coupling play, values of a quasi-linear rise of points of incidence of the two-dimensionally expanded light beam as a function of the angle of rotation are used.

5. Process in accordance with claim 3, wherein the machine parts that are loosely coupled by a coupling element are one of a measurement robot and a coordinate measurement device.

6. Process in accordance with claim 3, wherein the machine parts that are two coupled shafts of at least one of a motor, a pump and a transmission.

7. Process for determining the alignment of two hollow cylindrical machine parts with a first measurement unit with a light source for emitting a light beam which has been expanded in one plane, and a second measurement unit with an optical detector unit which comprises two linear sensors which are arranged parallel to one another, comprising the steps of:
mounting the first measurement unit in a first of the machine parts axially parallel thereto and the second measurement unit in a second of the machine parts axially parallel thereto,
emitting a light beam which is parallel to a longitudinal axis of the first machine part so as to be incident on the detector unit, said light beam being emitted in a two-dimensionally expanded fan-shaped in a plane transverse to said longitudinal axis and running tangentially to a circle around an axis of rotation at least one of the measurement units,
turning at least one of the measurement units about said axis of rotation axially parallel to said longitudinal axis and during rotation of said at least one of the measurement units, evaluating a light pattern which has been produced by the two-dimensionally expanded light beam on the two linear sensors which are arranged parallel to one another in a direction orthogonal to said longitudinal axis and crosswise of the direction of expansion of the light beam so that points of incidence of the expanded light beam produced on the line sensors intersect the two linear sensors in a middle area thereof and then migrate along the linear sensors during rotation of the light source relative to the detector unit for determining the misalignment of the axes of the machine parts relative to one another, by evaluating misalignment of the points of incidence of the two-dimensionally expanded light beam on the sensors.

8. Process in accordance with claim 7, comprising the further steps of:
mounting a third measurement unit, with a light source for emitting a second light beam which has been expanded in one plane, in the second of the machine parts,
mounting a fourth measurement unit, with an optical detector unit having two linear sensors which are arranged parallel to one another, in the first of the machine parts,
aligning the two-dimensionally expanded second light beam of the light source of the third measurement unit parallel to the longitudinal axis of the first machine part so as to be incident on the detector unit of the fourth measurement unit, and
during rotation of one of the machine parts, evaluating the incidence points of a light pattern produced by the second light beam on the sensors of the detector unit of the fourth measurement unit for determining the misalignment of the axes of the machine parts relative to one another.

9. Process for testing a component for straightness along a lengthwise side thereof using a first measurement unit with a light source for emitting a light beam which has been expanded in one plane, and a second measurement unit with an optical detector unit having two linear sensors which are located parallel to one another, comprising the steps of:
moving at least one of the measurement units along the lengthwise side of the component being tested while emitting said light beam in a manner that is two dimensionally expanded in one plane and evaluating a light pattern produced by the two-dimensionally expanded light beam on the two linear sensors which are arranged parallel to one another in a direction orthogonal to said lengthwise side and crosswise of the direction of expansion of the light beam.

10. Process in accordance with claim 9, wherein, for a change of a transverse angle of inclination which occurs during said movement of the measurement unit along the lengthwise side, determining a correction value for the points of incidence of the light beam on the sensors.

11. Device for determining the alignment of two rotatable machine parts, the alignment of two hollow cylindrical machine parts or for testing a component for straightness along a lengthwise side thereof, comprising:
- a first measurement unit with a light source configured for emitting a light beam which has been two-dimensionally expanded in one plane and means for mounting said first measuring unit on a part or component being tested so that the plane of expansion of the light beam is transverse to the longitudinal axis of said part or component,
- a second measurement unit with an optical detector unit having two linear sensors which are located parallel to another, and means for mounting said second measuring unit with the parallel sensors oriented crosswise of the plane of expansion of the light beam and
- an evaluation unit for evaluating a light pattern produced by the two-dimensionally expanded light beam on said parallel sensors for determining one of misalignment of the axes of the machine parts relative to one another, and straightness of the component, on the basis of points of incidence of the two-dimensionally expanded light beam on the sensors.

12. Device in accordance with claim 11, further comprising:
- a third measurement unit with a light source for emitting a second light beam which has been two-dimensionally expanded in one plane, and
- a fourth measurement unit with an optical detector unit having two line sensors which are arranged parallel to one another,
- wherein the evaluation unit evaluates the light pattern produced by the second light beam for determining said one of the misalignment of the axes of the machine part relative to one another and the straightness of the component, on the basis of points of incidence of at least one of the two light beams on the line sensors.

13. Device in accordance with claim 12, wherein the first and fourth measurement units are securely connected to one another and wherein the second and third measurement units are securely connected to one another.

14. Device in accordance with claim 13, wherein the first and fourth measurement units and the second and third measurement units are each located in a measurement head.

15. Device in accordance with claim 12, wherein the evaluation unit is adapted to operate for evaluating the light pattern produced by the light beam when at least one of the machine parts is turned around its axis with the fourth measurement unit attached to the first machine part, and the third measurement unit attached to the second machine part.

16. Device in accordance with claim 11, wherein the evaluation unit is adapted to operate for evaluating the light pattern produced by the light beam when at least one of the machine parts is turned around its axis with the first measurement unit attached to the first machine part, and the second measurement unit attached to the second machine part.

* * * * *